(12) United States Patent
Yamauchi

(10) Patent No.: US 6,618,647 B1
(45) Date of Patent: Sep. 9, 2003

(54) SUPERVISORY POWER SYSTEM CONTROL APPARATUS

(75) Inventor: Kenji Yamauchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,089

(22) Filed: Aug. 8, 2002

(30) Foreign Application Priority Data

Mar. 18, 2002 (JP) ......................................... 2002-073496

(51) Int. Cl.⁷ .............................. H02J 13/00; H02P 9/00
(52) U.S. Cl. .............................. 700/286; 700/9; 700/90; 700/295; 702/60; 340/3.1
(58) Field of Search .............................. 700/9, 90, 291, 700/295; 702/57, 60; 340/825, 3.1; 307/11

(56) References Cited

U.S. PATENT DOCUMENTS 4,833,592 A * 5/1989 Yamanaka ...................... 700/9
5,225,994 A * 7/1993 Arinobu et al. ............. 700/286

FOREIGN PATENT DOCUMENTS

JP  7-95736  4/1995

* cited by examiner

Primary Examiner—Jayprakash N. Gandhi
(74) Attorney, Agent, or Firm—Leydig, Voit & Mayer, Ltd.

(57) ABSTRACT

In a supervisory power system control apparatus having a remote supervisory control section and a computer, the computer acquires power system information from the remote supervisory control section, performs a data edit operation on the power system information, stores the edited power system information in a database, and uses it as supervisory control information. A substation number-delete flag allocation file is generated by judging whether individual items of the power system information are appropriate or inappropriate as the supervisory control information by the types of individual substations according to an external input. A data deletion check unit deletes inappropriate items of the power system information acquired from the remote supervisory control section by making reference to the substation number-delete flag allocation file before performing the data edit operation.

6 Claims, 19 Drawing Sheets

FIG. 2A

SUBSTATION NO.-DELETE FLAG ALLOCATION FILE

| SUBSTATION NO. | DELETE FLAG |
|---|---|
| 1 | 0 |
| 2 | 0 |
| 3 | 0 |
| 4 | 0 |
| 5 | 1 |
| 6 | 0 |
| 7 | 0 |
| 8 | 0 |
| 9 | 0 |
| 10 | 1 |
| 11 | 0 |
| 12 | 0 |
| 13 | 0 |
| 14 | 0 |
| 15 | 0 |

FIG. 2B

EDIT-QUEUING DATA FILE

| | SUBSTATION NO. | WORD NO. | BIT NO. | TYPE OF STATUS CHANGE |
|---|---|---|---|---|
| X | 10 | 1 | 3 | 1 |
| X | 10 | 1 | 4 | 1 |
| X | 10 | 1 | 5 | 1 |
| X | 10 | 1 | 3 | 0 |
| X | 10 | 1 | 4 | 0 |
| X | 10 | 1 | 5 | 0 |
| X | 10 | 1 | 3 | 1 |
| X | 10 | 1 | 4 | 1 |
| X | 10 | 1 | 5 | 1 |
| X | ⋮ | ⋮ | ⋮ | ⋮ |
| X | 10 | 13 | 3 | 1 |
| | 8 | 10 | 15 | 0 |
| | 12 | 18 | 2 | 1 |

FIG. 5

EDIT-QUEUING DATA FILE-DELETE FLAG VIEW

| | SUBSTATION NO. | WORD NO. | BIT NO. | TYPE OF STATUS CHANGE | DELETE FLAG |
|---|---|---|---|---|---|
| X | 10 | 1 | 3 | 1 | 1 |
| X | 10 | 1 | 4 | 1 | 1 |
| X | 10 | 1 | 5 | 1 | 1 |
| X | 10 | 1 | 3 | 0 | 1 |
| X | 10 | 1 | 4 | 0 | 1 |
| X | 10 | 1 | 5 | 0 | 1 |
| X | 10 | 1 | 3 | 1 | 1 |
| X | 10 | 1 | 4 | 1 | 1 |
| X | 10 | 1 | 5 | 1 | 1 |
| | ⋮ | ⋮ | ⋮ | ⋮ | |
| X | 5 | 14 | 3 | 1 | 1 |
| | 8 | 10 | 15 | 0 | 0 |
| | 12 | 18 | 2 | 1 | 0 |

FIG. 8A

NORMAL DATA FILE

| SUBSTATION NO. | WORD NO. | BIT NO. | TYPE OF STATUS CHANGE | DELETE FLAG |
|---|---|---|---|---|
| 8 | 10 | 15 | 0 | 0 |
| 12 | 18 | 2 | 1 | 0 |

FIG. 8B

DELETE DATA FILE

|   | SUBSTATION NO. | WORD NO. | BIT NO. | TYPE OF STATUS CHANGE | DELETE FLAG |
|---|---|---|---|---|---|
| X | 10 | 1 | 3 | 1 | 1 |
| X | 10 | 1 | 4 | 1 | 1 |
| X | 10 | 1 | 5 | 1 | 1 |
| X | 10 | 1 | 3 | 0 | 1 |
| X | 10 | 1 | 4 | 0 | 1 |
| X | 10 | 1 | 5 | 0 | 1 |
| X | 10 | 1 | 3 | 1 | 1 |
| X | 10 | 1 | 4 | 1 | 1 |
| X | 10 | 1 | 5 | 1 | 1 |
|   | : | : | : | : |   |
| X | 5 | 14 | 3 | 1 | 1 |

FIG. 12A

SUBSTATION NO.-DATA ATTRIBUTE ALLOCATION FILE

| SUBSTATION NO. | DELETE FLAG | TEST DATA FLAG |
|---|---|---|
| 1 | 0 | 0 |
| 2 | 0 | 0 |
| 3 | 0 | 0 |
| 4 | 0 | 0 |
| 5 | 1 | 0 |
| 6 | 0 | 0 |
| 7 | 0 | 0 |
| 8 | 0 | 0 |
| 9 | 0 | 0 |
| 10 | 1 | 0 |
| 11 | 0 | 0 |
| 12 | 0 | 0 |
| 13 | 0 | 0 |
| 14 | 0 | 0 |
| 15 | 0 | 0 |

FIG. 12B

EDIT-QUEUING DATA FILE-DATA ATTRIBUTE VIEW

| | SUBSTATION NO. | WORD NO. | BIT NO. | TYPE OF STATUS CHANGE | DELETE FLAG | TEST DATA FLAG |
|---|---|---|---|---|---|---|
| X | 10 | 1 | 3 | 1 | 1 | 0 |
| X | 10 | 1 | 4 | 1 | 1 | 0 |
| X | 10 | 1 | 5 | 1 | 1 | 0 |
| X | 10 | 1 | 3 | 0 | 1 | 0 |
| X | 10 | 1 | 4 | 0 | 1 | 0 |
| X | 10 | 1 | 5 | 0 | 1 | 0 |
| X | 10 | 1 | 3 | 1 | 1 | 0 |
| X | 10 | 1 | 4 | 1 | 1 | 0 |
| X | 10 | 1 | 5 | 1 | 1 | 0 |
| X | 5 | 14 | 3 | 1 | 1 | 0 |
| | 8 | 10 | 15 | 0 | 0 | 0 |
| | 12 | 18 | 2 | 1 | 0 | 0 |

FIG. 13A

SUBSTATION NO.-DATA ATTRIBUTE ALLOCATION FILE

| SUBSTATION NO. | DELETE FLAG | TEST DATA FLAG |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 1 |
| 13 | 0 | 0 |
| 14 | 0 | 0 |
| 15 | 0 | 0 |

FIG. 13B

EDIT-QUEUING DATA FILE-DATA ATTRIBUTE VIEW

| | SUBSTATION NO. | WORD NO. | BIT NO. | TYPE OF STATUS CHANGE | DELETE FLAG | TEST DATA FLAG |
|---|---|---|---|---|---|---|
| X | 10 | 1 | 3 | 1 | 0 | 0 |
| X | 10 | 1 | 4 | 1 | 0 | 0 |
| X | 10 | 1 | 5 | 1 | 0 | 0 |
| X | 10 | 1 | 3 | 0 | 0 | 0 |
| X | 10 | 1 | 4 | 0 | 0 | 0 |
| X | 10 | 1 | 5 | 0 | 0 | 0 |
| X | 10 | 1 | 3 | 1 | 0 | 0 |
| X | 10 | 1 | 4 | 1 | 0 | 0 |
| X | 10 | 1 | 5 | 1 | 0 | 0 |
| | : | : | : | : | | |
| X | 5 | 14 | 3 | 1 | 0 | 0 |
| X | 8 | 10 | 15 | 0 | 0 | 0 |
| | 12 | 18 | 2 | 1 | 0 | 1 |

FIG. 15

EDIT-QUEUING DATA FILE-VALIDITY DATA VIEW (ON-LINE MODE)

| | SUBSTATION NO. | WORD NO. | BIT NO. | TYPE OF STATUS CHANGE | VALIDITY FLAG |
|---|---|---|---|---|---|
| X | 10 | 1 | 3 | 1 | 0 |
| X | 10 | 1 | 4 | 1 | 0 |
| X | 10 | 1 | 5 | 1 | 0 |
| X | 10 | 1 | 3 | 0 | 0 |
| X | 10 | 1 | 4 | 0 | 0 |
| X | 10 | 1 | 5 | 0 | 0 |
| X | 10 | 1 | 3 | 1 | 0 |
| X | 10 | 1 | 4 | 1 | 0 |
| X | 10 | 1 | 5 | 1 | 0 |
| X | 5 | 14 | 3 | 1 | 0 |
| | 8 | 10 | 15 | 0 | 1 |
| | 12 | 18 | 2 | 1 | 1 |

EDIT-QUEUING DATA FILE-VALIDITY DATA VIEW (TEST MODE)

| | SUBSTATION NO. | WORD NO. | BIT NO. | TYPE OF STATUS CHANGE | VALIDITY FLAG |
|---|---|---|---|---|---|
| X | 10 | 1 | 3 | 1 | 0 |
| X | 10 | 1 | 4 | 1 | 0 |
| X | 10 | 1 | 5 | 1 | 0 |
| X | 10 | 1 | 3 | 0 | 0 |
| X | 10 | 1 | 4 | 0 | 0 |
| X | 10 | 1 | 5 | 0 | 0 |
| X | 10 | 1 | 3 | 1 | 0 |
| X | 10 | 1 | 4 | 1 | 0 |
| X | 10 | 1 | 5 | 1 | 0 |
| X | 5 | 14 | 3 | 1 | 0 |
| X | 8 | 10 | 15 | 0 | 0 |
| | 12 | 18 | 2 | 1 | 1 |

PRIOR ART

DATA DELETION SUBSTATION NO. FILE

EDIT-QUEUING DATA FILE

| DATA DELETION SUBSTATION NO. |
|---|
| 10 |
| 5 |
| |
| |
| |

| SUBSTATION NO. (1-n) | WORD NO. (1-n) | BIT NO. (0-15) | TYPE OF STATUS CHANGE (0, 1) |
|---|---|---|---|
| 10 | 1 | 3 | 1 |
| 10 | 1 | 4 | 1 |
| 10 | 1 | 5 | 1 |
| 10 | 1 | 3 | 0 |
| 10 | 1 | 4 | 0 |
| 10 | 1 | 5 | 0 |
| 10 | 1 | 3 | 1 |
| 10 | 1 | 4 | 1 |
| 10 | 1 | 5 | 1 |
| 5 | 14 | 3 | 1 |
| 8 | 10 | 15 | 0 |

STATUS CHANGE DATA TO BE DELETED

SUPERVISORY POWER SYSTEM CONTROL APPARATUS

BACKGROUND OF THE INVENTION

1. Field of the Invention

The present invention relates to a supervisory power system control apparatus which acquires information on the status of an electric power system and monitors and controls power system facilities based on this status information.

2. Description of the Background Art

A conventional supervisory power system control apparatus has a cathode ray tube (CRT),display terminal for on-screen display of an electric power system which is usually represented by use of imitative symbols and an operator console which allows an operator to enter signals for operating individual facilities of the power system. The operator monitors and controls the entire power system by using the CRT display terminal and the operator console.

FIG. 17 is a configuration diagram of an example of a conventional supervisory power system control apparatus disclosed in Japanese Laid-open Patent Publication No. 7-95736.

As shown in FIG. 17, power system information, which is information on individual facilities of a power system, is transmitted to a computer 5 via a remote supervisory control section 1. The remote supervisory control section 1 includes several devices; such as a distribution switchboard 2, a secondary remote supervisory control unit 3 and a primary remote supervisory control unit 4. The computer 5 can acquire the information on the individual facilities of the power system through all these devices: of the remote supervisory control section 1.

The power system information transmitted from the remote supervisory control section 1 is taken into the computer 5 by a data acquisition unit 6, which is a software-based functional unit provided in the computer 5, and transferred to a data edit unit 8 in the form of an edit-queuing data file 7. The information is then converted into internal codes of the computer 5 and stored in a power equipment database 9. Once stored in the power equipment-database 9, the power system information can be displayed at a CRT display terminal 11 or printed out by a printer 12 whenever necessary at the request of an operator entered from an operator console 10.

When controlling the individual facilities of the power system, the operator enters an instruction by using the CRT display terminal 11 and the operator console 10. A display/control output unit 13 converts the instruction into a relevant control signal, which is transmitted to the remote supervisory control section 1 in a direction opposite to the aforementioned direction of flow of the power system information for executing the instruction.

The computer 5 further includes as its internal functional units a delete data specifying unit 14 for specifying substation numbers of which data are to be deleted as designated by the operator through the operator console 10, a data deletion substation number file 15 for storing the specified substation numbers of which data are to be deleted,and a data deletion, check unit 16 for deleting the data of each substation to be deleted from data held in the edit-queuing data file 7 and transferring the remaining data to the data edit unit 8.In the remote supervisory control section 1, as transmission device is normally allocated to each substation and the power system facilities are usually inspected and maintained per substation, so that errors in the power system information are likely to occur for each individual substation, rather than for the entire power system. Accordingly, when the operator specifies a substation number of which data is to be deleted through the operator console 10 or the CRT display terminal 11, the data deletion check unit 16 recognizes the specified substation, deletes its data from the edit-queuing data file 7 and stores only appropriate data in the power equipment database 9.

FIG. 18A shows an example of data contents entered by using the operator console 10 or the CRT display terminal 11 and saved in the data deletion substation number file 15, and FIG. 18B shows an example of the power system information acquired from the remote supervisory control section 1 by the data acquisition unit 6 and saved in the edit-queuing data file 7.

A procedure performed by the data deletion check unit 16is now described with reference to the flowchart of FIG. 19.

First, one of substation numbers of which data are to be deleted that are saved in the data deletion substation number file 15 is selected in step ST1.

Next, in step ST2, the data deletion check unit 16 examines the substation number of which data is to be deleted selected in step ST1 and edit-queuing data of all substations stored in the edit-queuing data file 7 in the order of ascending substation numbers. Details of the this check process are explained below in relation to steps ST3 to ST5.

Specifically, the data deletion check unit 16 judges whether or not the substation number of which data is to be deleted selected in step ST1 matches any of the substation numbers stored in the edit-queuing data file 7 (step ST3). If the judgment result in step ST3 is in the negative (No in step ST3), the edit-queuing data in the edit-queuing data file 7 is not deleted but transferred to the data edit unit 8 for editing and storage in the power equipment database 9 (step ST4). If the substation number selected in step ST1 matches one of the substation numbers stored in the edit-queuing data file 7 (Yes in step ST3), the data on the relevant substation number is deleted from the edit-queuing data file 7 and not stored in the power equipment database 9 (step ST5).

The data deletion check unit 16 then examines whether the aforementioned operations of steps ST1 to ST5 have been executed on all the substation numbers specified in the data deletion substation number file 15 (step ST6), and if the operations have been completed, the data deletion check unit 16 quits the procedure of FIG. 19.

Even when inappropriate pieces of information occur on a specific substation, they can be deleted by entering the relevant substation number in the aforementioned conventional supervisory power system control apparatus, enabling the operator to recognize only appropriate pieces of power system information in a reliable manner.

In the supervisory power system control apparatus constructed as described above, it is necessary to examine the entirety of the edit-queuing data individually stored in the edit-queuing data file 7 for the specified substation numbers of which data are to be deleted in order to delete inappropriate pieces of the power system information. Thus, the conventional supervisory power system control apparatus is associated with a complicated operation flow, which results in difficulty in efficiently deleting the inappropriate pieces of the power system information and poor software maintainability.

SUMMARY OF THE INVENTION

This invention is intended to overcome the aforementioned problems of the prior art. Accordingly, it is an object of the invention to provide a supervisory power system control apparatus employing a simple operation flow which makes it possible to quickly examine the appropriateness of information and delete inappropriate pieces of power system information even after an information processing section of the apparatus has taken in such inappropriate pieces of power system information and provides improved software maintainability.

In one feature of the invention, a supervisory power system control apparatus includes in its information processing section a specifier, an allocation file and a data deletion checker. The specifier judges whether individual pieces of power system information acquired from a supervisory control section are appropriate or inappropriate as supervisory control information by the types of facilities of an electric power system and specifies a facility type of which power system information is inappropriate according to an external input. The allocation file is generated by attaching an appropriateness flag to each of the facilities based on information specified by the specifier. The data deletion checker deletes inappropriate pieces of the power system information referring to the allocation file before performing data edit operation, so that only those pieces of the power system information which are appropriate as the supervisory, control information are stored in a power equipment database.

This construction makes it possible to examine the appropriateness of the power system information and quickly delete inappropriate pieces of the power system information with high efficiency and ease. The construction also enables an improvement in software maintainability.

In another feature of the invention, a supervisory power system control apparatus includes in its information processing section a first specifier, a second specifier, an allocation file and a data deletion checker, the information processing section having two operating modes named normal mode and test mode. The first specifier judges whether individual pieces of power system information acquired from a supervisory control section are appropriate or inappropriate as the supervisory control information by the types of facilities, and specifies a facility type of which power system information is inappropriate according to an external input. The second specifier specifies test data included in the power system information based on the facility type according to the external input. The allocation file is generated by attaching an appropriateness flag to each of the facilities based on information specified by the first specifier in the normal mode and by attaching a flag indicating whether data is the test data to each of the facilities based on information specified by the second specifier in the test mode. The data deletion checker deletes inappropriate pieces of the power system information referring to the allocation file before performing data edit operation, so that only those pieces of the power system information which are appropriate as the supervisory control information are stored in a power equipment database in the normal mode, and only the test data included in the power system information is stored in the power equipment database in the test mode. This construction makes it possible to examine the appropriateness of the power system information and quickly delete inappropriate pieces of the power system information under normal operating, condition delete other pieces of the power system information than the test data during execution of a data test, with high efficiency sand ease. The construction also enables an improvement in software maintain ability In still another feature of the invention, a supervisory power system control apparatus includes in its information processing section a specifier, an allocation file, an edit-queuing normal data file and a delete data file. The specifier judges whether individual pieces of the power system information acquired from a supervisory control section are appropriate or inappropriate as supervisory control information by the types of the facilities of an electric power system and specifies a facility type of which power system information is inappropriate according to an external input. The allocation file is generated by attaching an appropriateness flag to each of the facilities based on information specified by the specifier. The edit-queuing normal data file and the delete data file are generated from the allocation file and an edit-queuing data file holding the power system information acquired from the supervisory control section by use of a join function and a filtering function of an operating system having a relational database function, whereby only those pieces of the power system information which are held in the edit-queuing normal data file are stored in a power equipment database after performing data edit operation.

This construction eliminate the need for dedicated software programs for examining the appropriateness of the power system information and deleting inappropriate pieces of the power system information, so that the information processing section is simplified and software maintainability is improved.

These and other objects, features and advantages of the invention will become more apparent upon reading the following detailed description in conjunction with the accompanying drawings.

BRIEF DESCRIPTION OF THE DRAWINGS

FIGS. 2A and 2B show examples of data contents of files used by the supervisory power system control apparatus of the first embodiment;

FIG. 5 shows an example of data contents of a file used by the supervisory power system control apparatus of the second embodiment;

FIGS. 8A and 8B show examples of data contents of files used by the supervisory power system control apparatus of the third embodiment;

FIGS. 12A and 12B show examples of data contents of files used by the supervisory power system control apparatus of the fourth embodiment;

FIGS. 13A and 13B show examples of data contents of files used by the supervisory power system control apparatus of the fourth embodiment;

FIG. 15 shows examples of data contents of files used by a supervisory power system control apparatus of a fifth embodiment;

FIGS. 18A and 18B show examples of data contents of files used by the conventional supervisory power system control apparatus.

DESCRIPTION OF THE PREFERRED EMBODIMENTS

First Embodiment

A supervisory power system control apparatus according to a first embodiment of the invention is described with reference to its configuration diagram given in FIG. 1.

Figure 1:
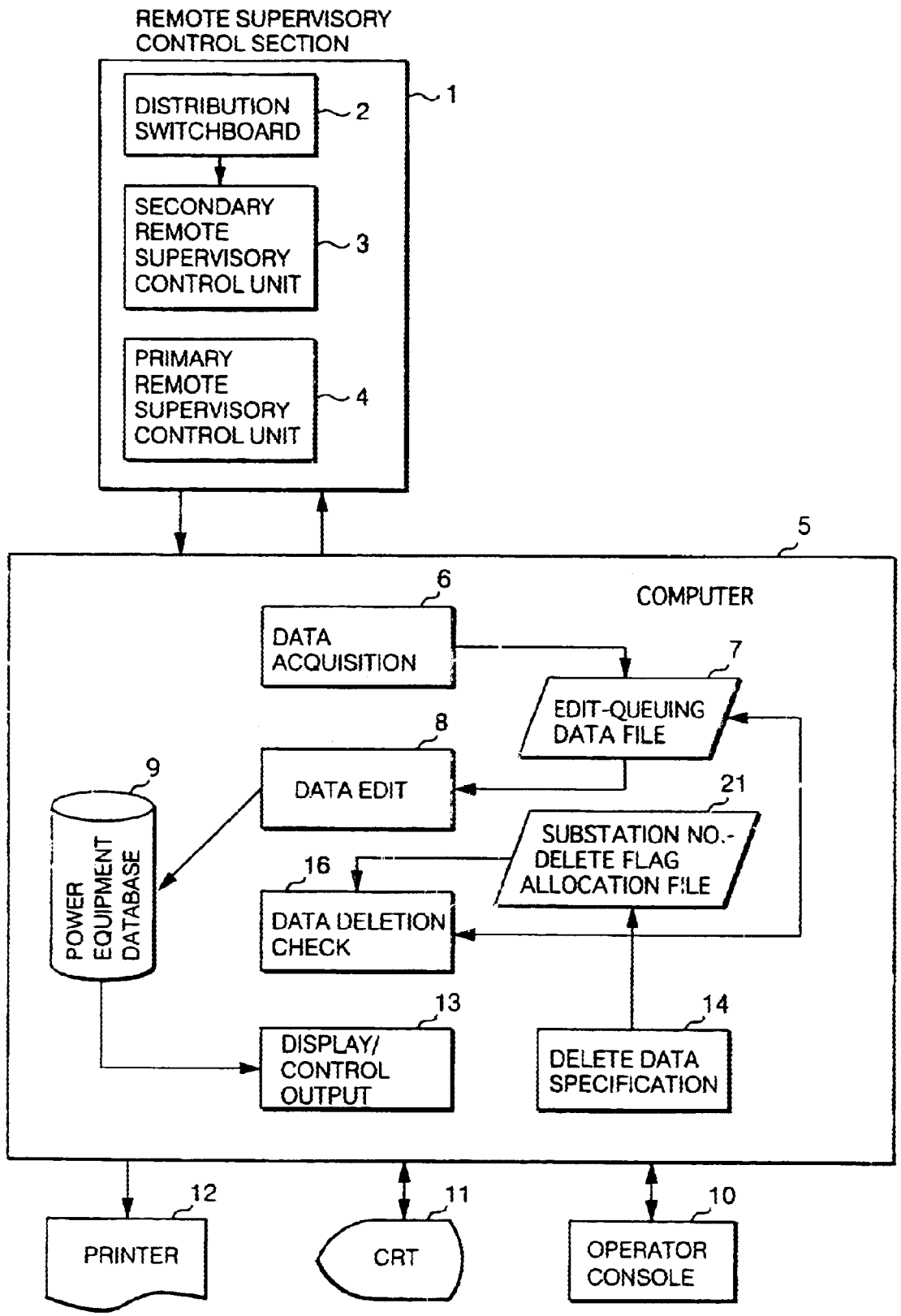
FIG. 1 is a configuration diagram of a supervisory power system control apparatus according to a first embodiment of the invention.

As shown in FIG. 1, the supervisory power system control apparatus of this embodiment has a CRT display terminal 11 which provides an on-screen display of an electric power system by use of imitative symbols and an operator console 10 which allows an operator to enter signals for operating individual facilities of the power system. The operator monitors and controls the entire power system by using the CRT display terminal 11 and the operator console 10. Power system information which is information on the individual facilities of the power system, is transmitted to a computer 5 via a remote supervisory control section 1 which serves as a supervisory control section. The remote supervisory control section 1 includes several devices, such as a distribution switchboard 2, a secondary remote supervisory control unit 3 and a primary remote supervisory control unit 4. The computer 5 can acquire the information on the individual facilities of the power system through all these devices of the remote supervisory control section 1.

The power system information transmitted from the remote supervisory control section 1 is taken into the computer 5 by a data acquisition unit 6, which is a software-based functional unit provided in the computer 5, and transferred to a data edit unit 8 in the form of an edit-queuing data file 7. The information is then converted into internal codes of the computer 5 and stored in a power equipment database 9. Once stored in the power equipment database 9, the power system information can be displayed at the CRT display terminal 11 or printed out by a printer 12 whenever necessary at the request of the operator entered from the operator console 10.

When controlling the individual facilities of the power system, the operator enters an instruction by using the CRT display terminal 11 and the operator console 10. A display/control output unit 13 converts the instruction into a relevant control signal, which is transmitted to the remote supervisory control section 1 in a direction opposite to the aforementioned direction of flow of the power system information for executing the instruction.

The computer 5 further includes as its software-based internal functional units a delete data specifying unit 14 for specifying substation numbers of which data are to be deleted as designated by the operator through the operator console 10, a substation number-delete flag allocation file 21 which allocates delete flags serving as appropriateness flags indicating whether data of individual substations are appropriate or inappropriate based on the substation numbers specified by the delete data specifying unit 14, and a data deletion check unit 16 for deleting the data of each substation to be deleted from data held in the edit-queuing data file 7 and transferring the remaining data to the data edit unit 8.

As stated earlier in relation to the conventional supervisory power system control apparatus, a transmission device is allocated to each substation and the power system facilities are usually inspected and maintained per substation in the remote supervisory control section 1, so that errors in the power system information are likely to occur for each individual substation, rather than for the entire power system. Accordingly, individual pieces of the power system information are judged by whether they are appropriate or inappropriate as supervisory control information by the types of the individual facilities (that is, the substation numbers in this embodiment) and, then, the operator designates the substation numbers of which data are inappropriate. As a result, the power system information of the designated substation numbers are deleted as being inappropriate pieces of information.

Operations for deleting the inappropriate pieces of the power system information are described in detail below.

The power system information taken into the computer 5 is once saved in the edit-queuing data file 7. If a great deal of status change information occurs due to facility anomalies such as a transmission line failure or overheat or inspection of a facility, information on an abnormal status change is continuously displayed on the CRT display terminal 11 or printed out by the printer 12, for example, the operator recognizes an abnormal situation. In this case, the operator takes necessary steps to cope with the abnormal situation, informing parties concerned of the occurrence of the abnormal situation, and enters substation numbers of which data are to be deleted through the operator console 10 (or the CRT display terminal 11). The substation numbers of which data are to be deleted as designated by the operator in this fashion are set in the delete data specifying unit 14, which generates the substation number-delete flag allocation file 21 in which the individual substations are all assigned delete flags serving as appropriateness flags.

FIG. 2A is a table showing an example of data contents of the substation number-delete flag allocation file 21 generated based on the substation numbers of which data are to be deleted as entered by using the operator console 10, in which each substation number of which data is to be deleted is assigned a delete flag "1" while the other substation numbers are each assigned a delete flag "0". FIG. 2B is a table showing an example of data contents of the edit-queuing data file 7 which saves the power system information acquired by the data acquisition unit 6 from the remote supervisory control section 1. Referring to FIG. 2B, the power system information in the edit-queuing data file 7 includes the substation number of each facility (substation) in which a status change has occurred, a status change address (word No., bit No.) and the type of status change which can take two values, "1" (ON) and "0" (OFF). Each "X" shown on the left of the table of FIG. 2B indicates that information in the relevant row is part of the power system information to be deleted.

By making reference to the substation number-delete flag allocation file 21, the data deletion check unit 16 deletes data of each substation to be deleted and transfers the remaining data to the data edit unit 8.

A procedure performed by the data deletion check unit 16 is now described with reference to the flowchart of FIG. 3.

First, the data deletion check unit 16 examines all edit-queuing data in the edit-queuing data file 7 in step S1. This check processes specifically explained in relation to steps S2 to S5 below.

The data deletion check unit 16 then judges whether or not checking of all the edit-queuing data in the edit-queuing data file 7 has been completed in step S2. If the checking has not been completed (No in step S2), the data deletion check unit 16 judges whether the value of the delete flag assigned to the edit-queuing data of the next substation number is "1" or not by reference to the substation number-delete flag allocation file 21 in step S3. If the delete flag is not "1" (No in step S3), the data deletion check unit 16 transfers the edit-queuing data of the relevant substation to the data edit unit 8 for editing and storage in the power equipment database 9 without deleting the data in step S4. If the delete flag is "1" (Yes in step S3), the data deletion check unit 16 deletes the edit-queuing data of the relevant substation in the edit-queuing data file 7 so as not to store the data in the power equipment database 9 in step S5.

Figure 3:
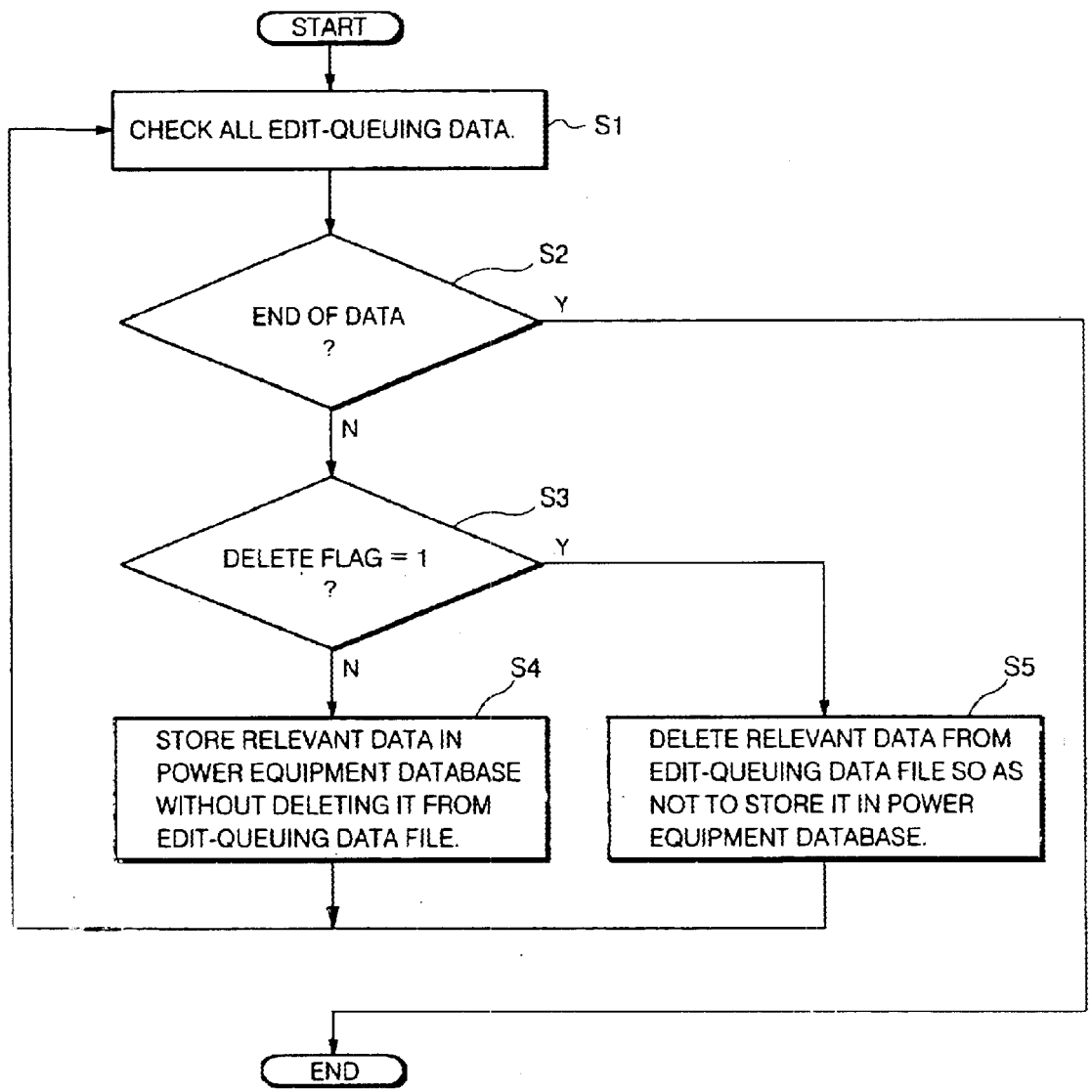
FIG. 3 is a flowchart showing operations performed by a data deletion check unit of the first embodiment.

The data deletion check unit 16 repeatedly executes the aforementioned operations of steps S2 to S5 and, when the operations are finished for the edit-queuing data of all the substations, the data deletion check unit 16 Judges that the check process has been completed and terminates the procedure of FIG. 3 in step S2.

Since those pieces of the power system information which are inappropriate as supervisory control information are eliminated according to operator entries of particular substation numbers, the operator is can recognize only appropriate pieces of information. Also, due to the provision of the substation number-delete flag allocation file 21 generated by the delete data specifying unit 14 according to the operator entries assigning the delete flags serving as appropriateness flags to all the substation numbers, it is possible to easily acquire the delete flags by reference to the allocation file 21. It would be appreciated from the foregoing that the present embodiment provides a simple operation flow employing a single loop which makes it possible to examine the appropriateness of the edit-queuing data in the edit-queuing data file 7 and quickly delete inappropriate pieces of information. This would enable efficient processing of the power system information and an improvement in software maintainability.

While the supervisory power system control apparatus of the foregoing embodiment handles the power system information on the individual transformer substations, the power system information may contain data on other types of facilities, such as a gas insulated switchgear. Facilities like the gas insulated switchgear involve a considerably large amount of information, which would be transmitted separately for each individual facility. When the power system information contains information on other facilities than the substations, the appropriateness of individual pieces of the power system information may be checked for each type of the facilities so that the operator can specify the facilities of which data are inappropriate as supervisory control information.

Second Embodiment

Figure 4:
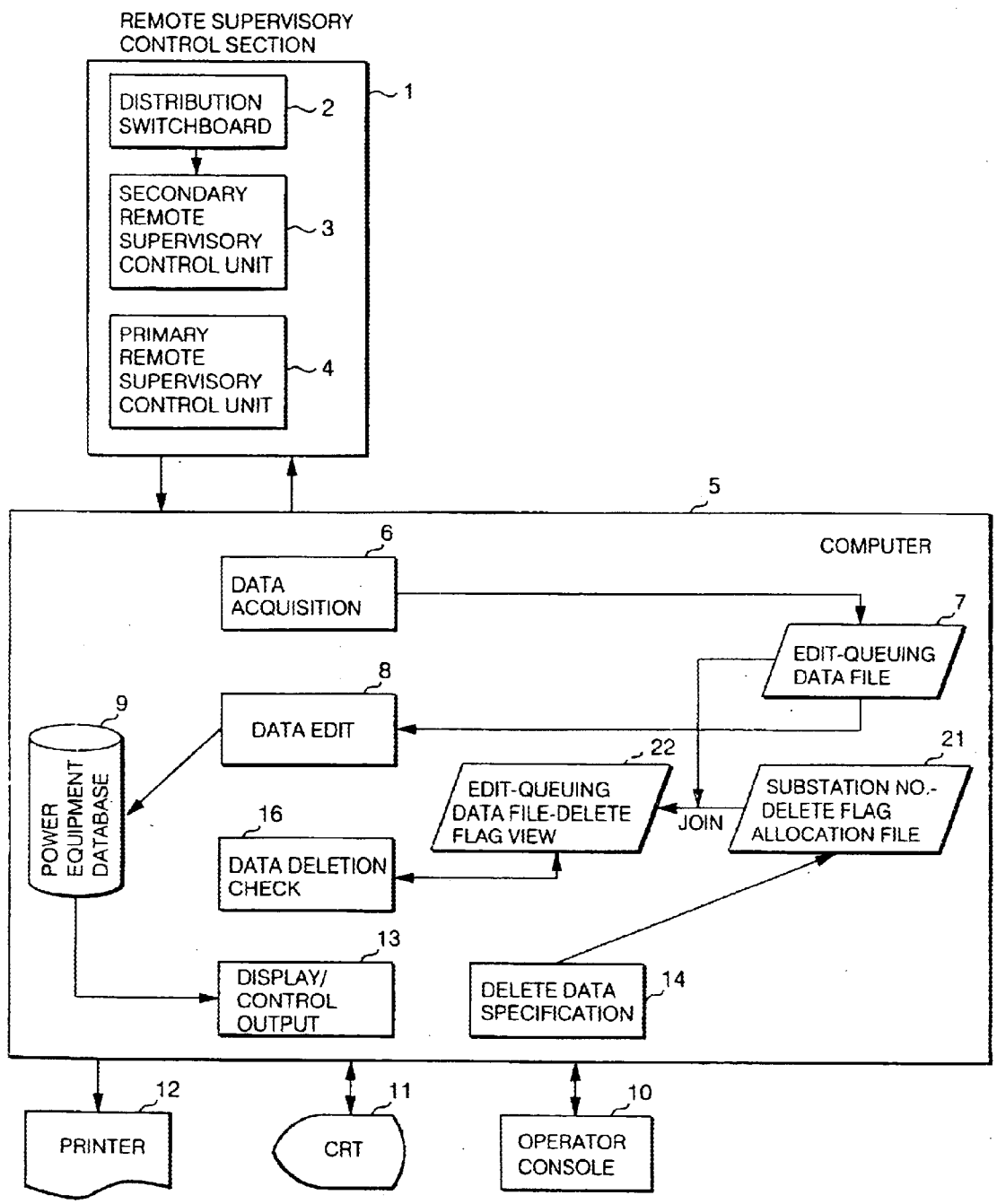
FIG. 4 is a configuration diagram of a supervisory power system control apparatus according to a second embodiment of the invention.

A supervisory power system control apparatus according to a second embodiment of the invention is now described with reference to its configuration diagram given in FIG. 4. The numerals 1 to 14 and 21 in FIG. 4 designate elements identical or essentially equivalent to those of the first embodiment indicated by the same numerals in FIG. 1. The computer 5 of the second, embodiment employs an operating system having a relational database function. Referring to FIG. 4, designated by the numeral 22 is an edit-queuing data file-delete flag view which is a virtual table generated by joining the substation number-delete flag allocation file 21 and the edit-queuing data file 7 by use of a join function of the relational database, and designated by the numeral 16 is a data deletion check unit which deletes the data of each substation to be deleted from data held in the edit-queuing data file 7 by performing a data delete operation on the edit-queuing data file-delete flag view 22.

Power system information taken into the computer 5 by the data acquisition unit 6 is once retained in the edit-queuing data file 7. As the operator enters substation numbers of which data are to be deleted, the substation numbers of which data are to be deleted are set in the delete data specifying unit 14, which generates the substation number-delete flag allocation file 21 in which the individual substations are assigned delete flags serving as appropriateness flags in the same fashion as described in the first embodiment. When the substation number-delete flag allocation file 21 has been generated, the edit-queuing data file-delete flag view 22 is generated by joining the substation number-delete flag allocation file 21 and the edit-queuing data file 7.

FIG. 5 is a table showing an example of data contents of the edit-queuing data file-delete flag view 22 generated from the substation number-delete flag allocation file 21 shown in FIG. 2A and the edit-queuing data file.7 shown in FIG. 2B. As shown in FIG. 5, individual edit-queuing data in the edit-queuing data file-delete flag view 22 are each assigned a delete flag "0" or "0". The data deletion check unit 16 deletes the edit-queuing data which are assigned the delete flag "1". Each "X"shown on the left of the table of FIG. 5 indicates that Information in the relevant row is part of the power system information to be deleted.

With this arrangement, the edit-queuing data to be deleted are automatically deleted also in the original edit-queuing data file 7 of the edit-queuing data file-delete flag view 22 which contains virtual data, and the edit-queuing data not to be deleted are transferred to the data edit unit 8.

A procedure performed by the data deletion check unit 16 is now described with reference to the flow chart of FIG. 6.

First, the data deletion check unit 16 examines all edit-queuing data in the edit-queuing data file-delete flag view 22 in step T1. This check process is specifically explained in relation to steps T2 to T5 below.

The data deletion check unit 16 then judges whether or not checking of all the edit-queuing data in the edit-queuing data file-delete flag view 22 has been completed in step T2. If the checking has not been completed (No in step T2), the data deletion check unit 16 judges whether the value of the delete flag assigned to the edit-queuing data of the next substation number is "1" or not by reference to the edit-queuing data file-delete flag view 22 in step T3. If the delete flag is not "1" (No in step T3), the data deletion check unit 16 transfers the edit-queuing data of the relevant substation in the edit-queuing data file 7 to the data edit unit 8 for storage in the power equipment database 9 without deleting the data in step T4. If the delete flag is "1"(Yes in step T3), the data deletion check unit 16 deletes the edit-queuing data of the relevant substation in the edit-queuing data file-delete flag view 22 and, as a consequence, the corresponding edit-queuing data in the original edit-queuing data file 7 is deleted without being stored in the power equipment database 9 in step T5.

Figure 6:
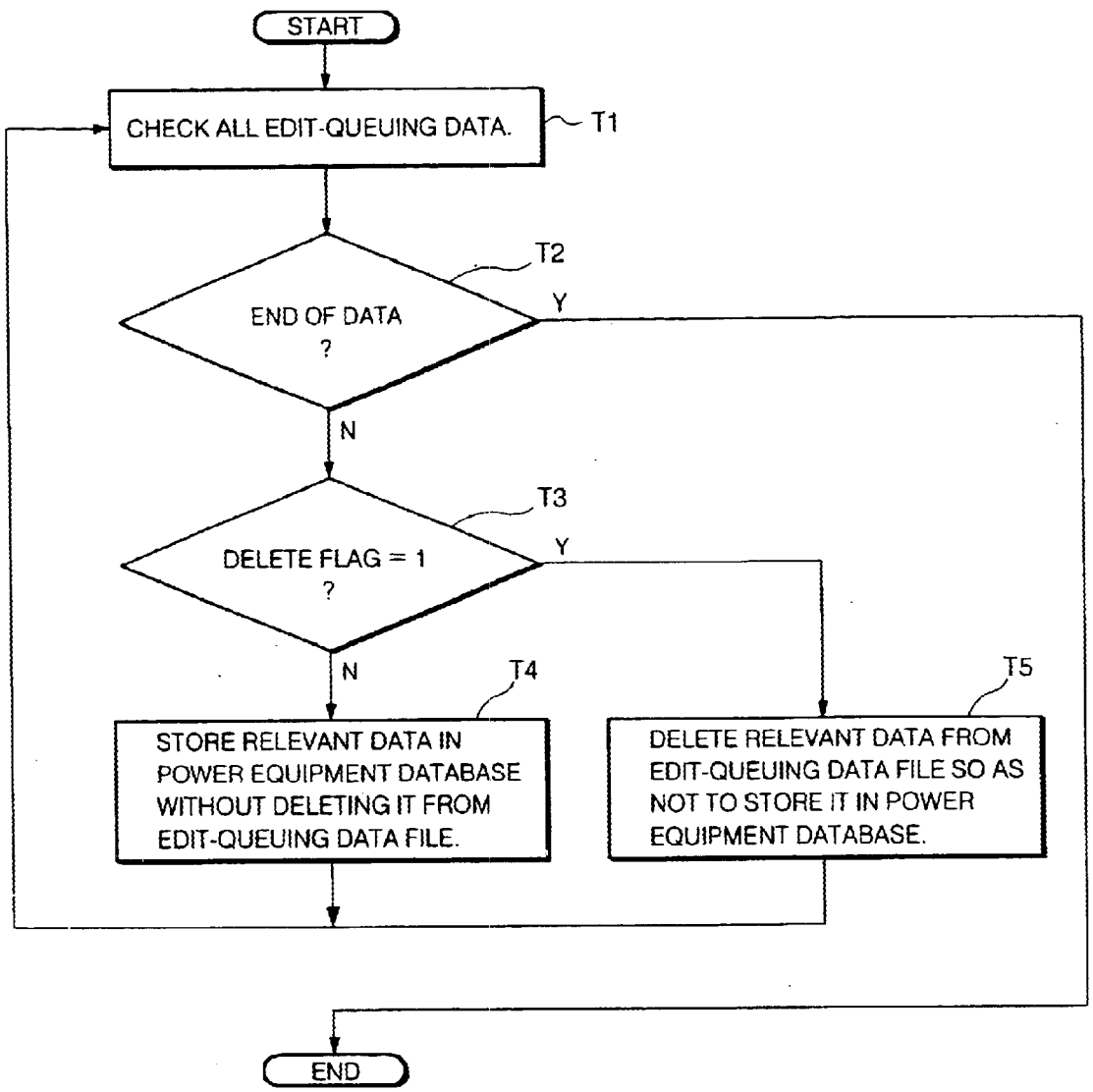
FIG. 6 is a flowchart showing operations performed by a data deletion check unit of the second embodiment.

The data deletion check unit 16 repeatedly executes, the aforementioned operations of steps T2 to T5 and, when the operations are finished for the edit-queuing data of all the substations, the data deletion check unit 16 judges that the check process has been completed and terminates the procedure of FIG. 6 in step T2.

Since those pieces of the power system information which are inappropriate as supervisory control information are eliminated according to operator entries of particular substation numbers, the operator is can recognize only appropriate pieces of information. In this embodiment, the edit-queuing data file-delete flag view 22 is generated by joining the substation number-delete flag allocation file 21, in which the delete flags serving as appropriateness flags are assigned to all the substation numbers, and the edit-queuing data file 7 using the join function of the relational database. It is therefore possible to examine the appropriateness of the edit-queuing data in the edit-queuing data file-delete flag view 22 and quickly delete inappropriate pieces of information without referring to any other file than the edit-queuing data file-delete flag view 22. This would serve to provide a simpler operation flow and further improved software maintainability.

Third Embodiment

Figure 7:
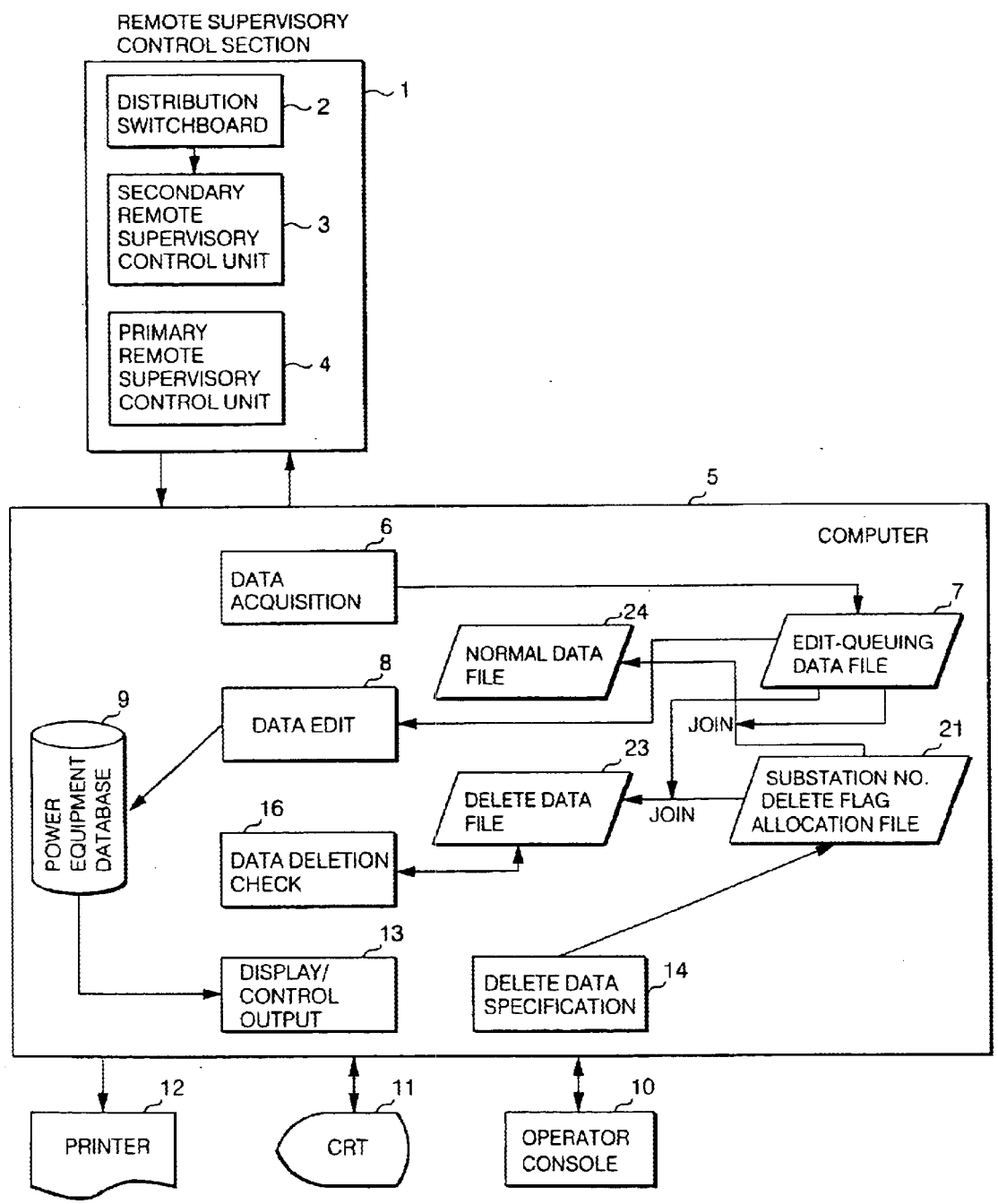
FIG. 7 is a configuration diagram of a supervisory power system control apparatus according to a third embodiment of the invention.

A supervisory power system control apparatus according to a third embodiment of the invention is now described with reference to its configuration diagram given in FIG. 7. The numerals 1 to 14 and 21 in FIG. 7 designate elements identical or essentially equivalent to those of the first embodiment indicated by the same numerals in FIG. 1. The computer 5 of the third embodiment employs an operating system having a relational database function. By using a join function and filtering function of the relational database, the computer 5 joins the substation number-delete flag allocation file 21 and the edit-queuing data file 7 and holds as virtual data a delete data file 23 generated by extracting those data of which delete flag is "1" and a normal data file 24 generated by extracting those data of which delete flag is "0". Designated by the numeral 16 in FIG. 7 is a data deletion check unit which deletes the data of each substation to be deleted from data held in the edit-queuing data file 7 by performing a data delete operation on the delete data file 23.

Power system information taken into the computer 5 by the data acquisition unit 6 is once retained in the edit-queuing data file 7. As the operator enters substation numbers of which data are to be deleted, the substation numbers of which data are to be deleted are set in the delete data specifying unit 14, which generates the substation number-delete flag allocation file 21 in which the individual substations are assigned delete flags serving as appropriateness flags in the same fashion as described in the first embodiment. When the substation number-delete flag allocation file 21 has been generated, a temporary edit-queuing data file-delete flag view 22 is generated by joining the substation number-delete flag allocation file 21 and the edit-queuing data file 7.

From this temporary edit-queuing data file-delete flag view 22 (FIG. 5) generated by joining the substation number-delete flag allocation file 21 (FIG. 2A) and the edit-queuing data file 7 (FIG. 2B), the normal data file 24 shown in FIG. 8A is generated by extracting the data of which delete flag is "0", while the delete data file 23 shown in FIG. 8B is generated by extracting the data of which delete flag is "1". Each "X" shown on the left of the table of FIG. 8B indicates that information in the relevant row is part of the power system information to be deleted.

Figure 9:
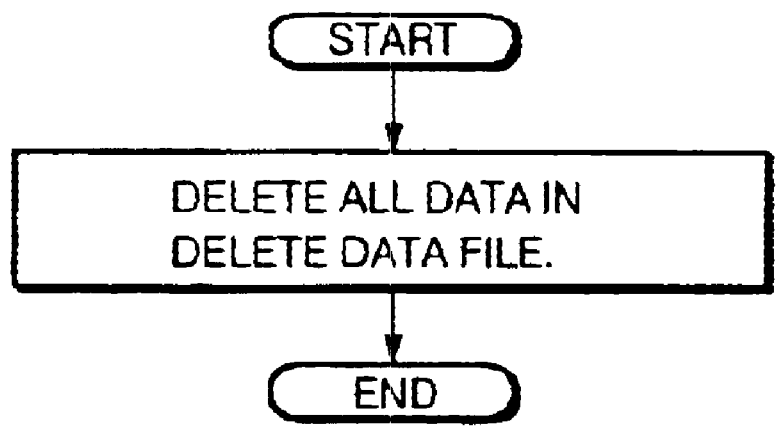
FIG. 9 is a flowchart showing operations performed by a data deletion check unit of the third embodiment.

The data deletion check unit 16 deletes all the edit-queuing data in the delete data file 23 as shown in FIG. 9. As a result, the corresponding edit-queuing data are automatically deleted also in the original edit-queuing data file 7 from which the virtual data have been generated, and the edit-queuing data not to be deleted are transferred to the data edit unit 8.

In this embodiment, it is necessary for the data deletion check unit 16 to just delete all the data in the delete data file 23 generated as described above, so that data delete operation is extremely simple and the software maintainability is exceptionally good.

Figure 10:
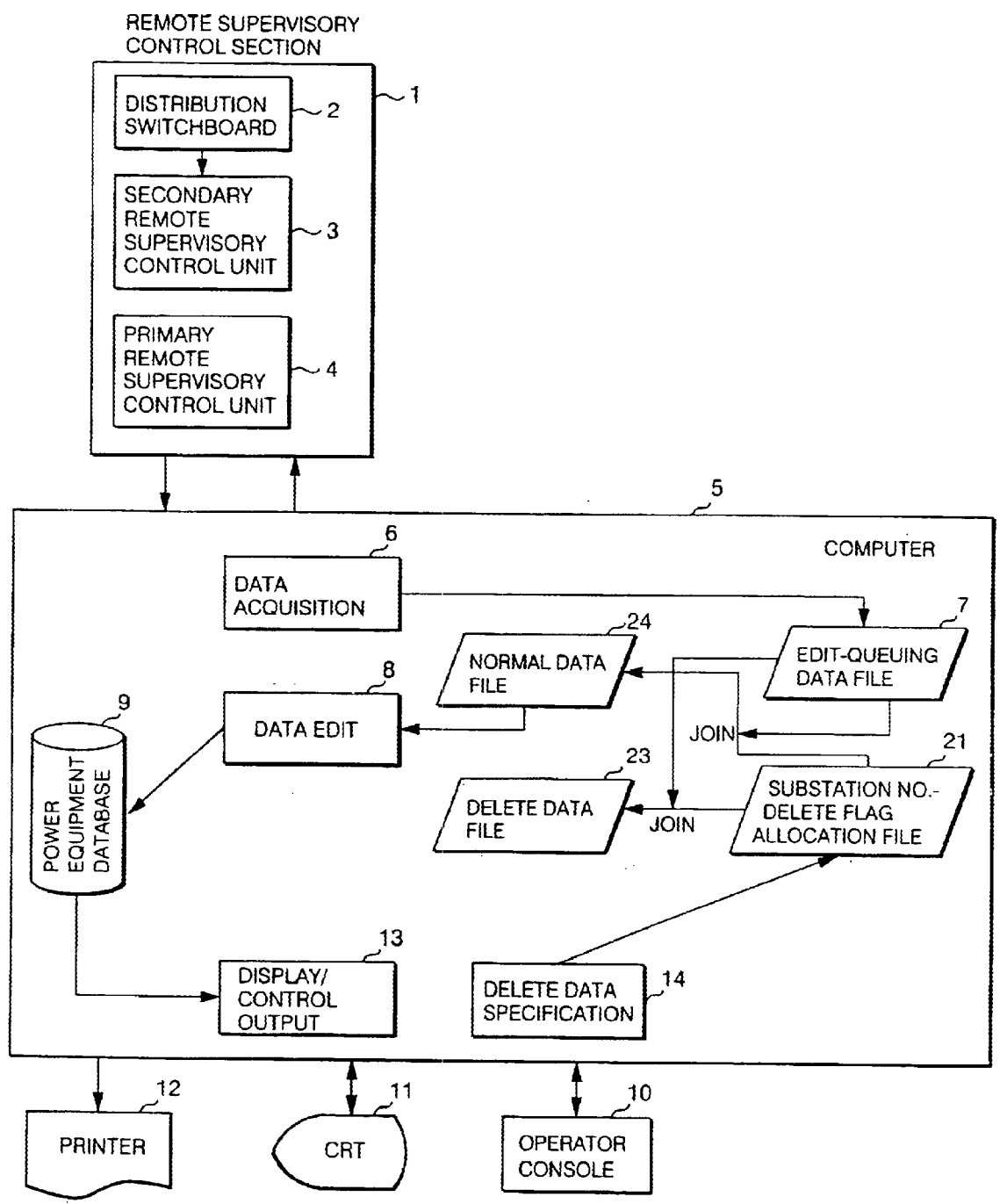
FIG. 10 is a configuration diagram of a supervisory power system control apparatus in one variation of the third embodiment of the invention.

In one variation of this embodiment, the edit-queuing data in the normal data file 24 may be simply transferred to the data edit unit 8 and stored in the power equipment database 9 after editing without performing any operation on the delete data file 23 as shown in FIG. 10.

This variation of the third embodiment does not require the data deletion check unit 16 which is a software-based internal functional unit for deleting the data of specific substations, thus making the configuration of the computer 5 yet simpler.

Fourth Embodiment

Figure 11:
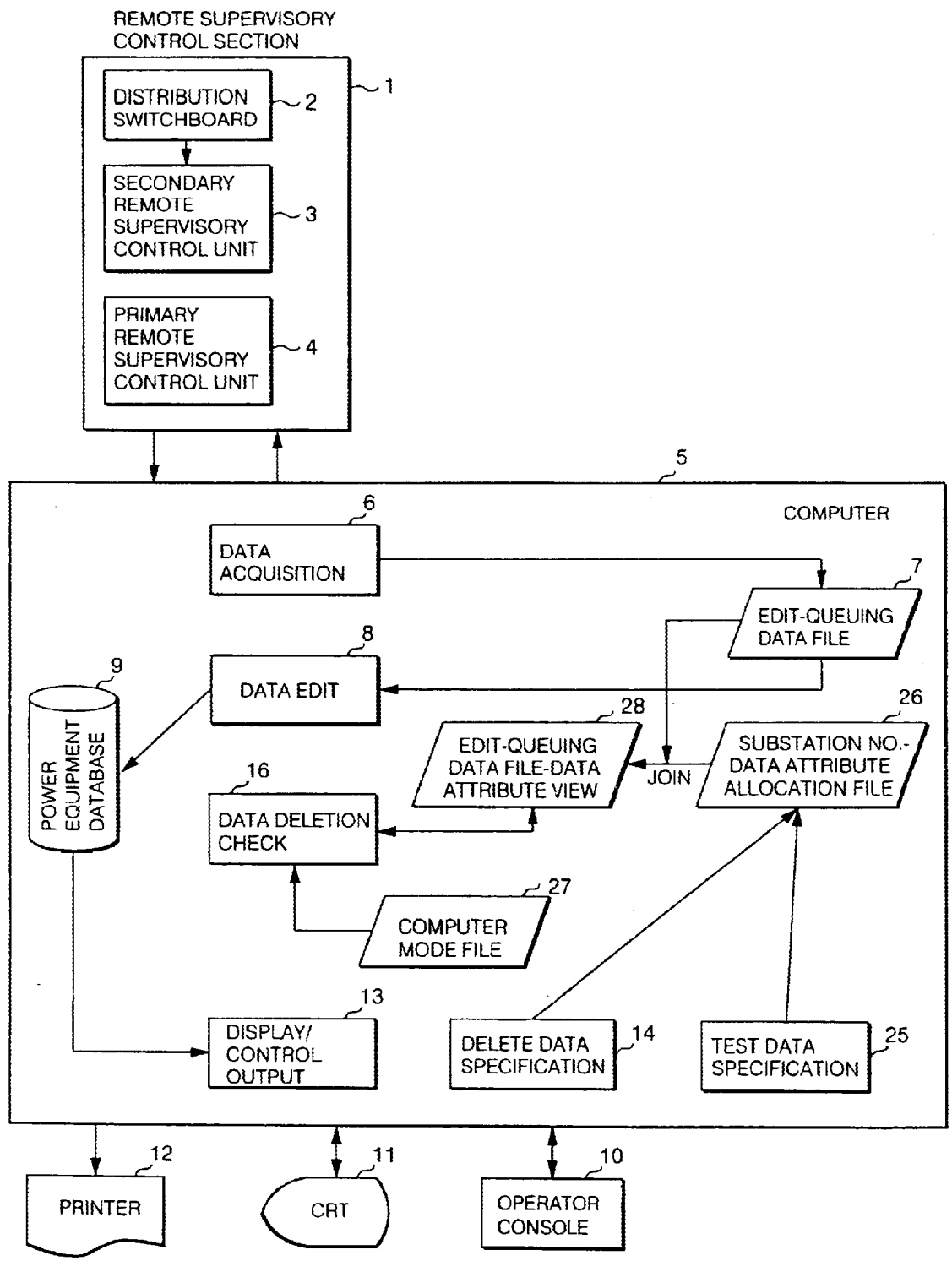
FIG. 11 is a configuration diagram of a supervisory power system control apparatus according to a fourth embodiment of the invention.

A supervisory power system control apparatus according to a fourth embodiment of the invention is now described with reference to its configuration diagram given in FIG. 11. The numerals 1 to 14 and 21 in FIG. 11 designate elements identical or essentially equivalent to those of the first embodiment indicated by the same numerals in FIG. 1. In this embodiment, the computer 5 has two operating modes, that is, on-line mode (which is normal mode) and test mode. Referring to FIG. 11, designated by the numeral 27 is a computer mode file for specifying the operating mode-of the computer 5, designated by the numeral 25 is a test data specifying unit serving as a second specifying unit for specifying a substation number to be tested as designated by the operator through the operator console 10, and designated by the numeral 26 is a substation number-data attribute allocation file in which the individual substations are all assigned flags (delete or test data flags) according to substation numbers specified by the delete data specifying unit 14 serving as a first specifying unit or the test data specifying unit 25. The computer 5 of the fourth embodiment employs an operating system having a relational database function. In FIG. 11, designated by the numeral 28 is an edit-queuing data file-data attribute view which is a virtual table generated by joining the substation number-data attribute allocation file 26 and the edit-queuing data file 7 by use of a join function of the relational database, and designated by the numeral 16 is a data deletion check unit which deletes specific data from data held in the edit-queuing data file 7 by performing a data delete operation on the edit-queuing data file-data attribute view 28. Power system information taken into the computer 5 by the data acquisition unit 6 is once retained in the edit-queuing data file 7. In the on-line mode (="1"), substation numbers of which data are to be deleted are set in the delete data specifying unit 14 as the operator enters the substation numbers of which data are to be deleted in the same fashion as described in the first embodiment.

Then, according to this information, the delete data specifying unit 14 generates the substation number-data attribute allocation file 26 in which the individual substations are assigned delete flags serving as appropriateness flags. In this case, the test data flags of all the substations take the value "0" which indicates an initial state. FIG. 12A is a table showing an example of data contents of the substation number-data attribute allocation file 26 used in the on-line mode, and FIG. 12B is a table showing an example of data contents of the edit-queuing data file-data attribute view 28 generated by joining the substation number-data attribute allocation file 26 of FIG. 12A and the edit-queuing data file 7.

When executing a data test after modifying the database 9, for example, the operating mode in the computer mode file 27 is set to the test mode (="2") by an operator input. Subsequently, as the operator enters particular substation numbers, the substation numbers of which data are to be tested are specified in the test data specifying unit 25. Then, according to this information, the substation number-data attribute allocation file 26 in which all the substation numbers are assigned test data flags indicating whether data of the individual substations are test data or not is generated. In this case, the delete flags of all the substations take the value "0" which indicates an initial state. FIG. 13A is a table showing an example of data contents of the substation number-data attribute allocation file 26 used in the test mode, and FIG. 13B is a table showing an example of data contents of the edit-queuing data file-data attribute view 28 generated by joining the substation number-data attribute allocation file 26 of FIG. 13A and the edit-queuing data file 7. As shown in FIGS. 12B and 13B, individual edit-queuing data in the edit-queuing data file-data attribute view 28 are each assigned a delete flag or a test data flag. The data deletion check unit 16 deletes part of the edit-queuing data according to the operating mode set in the computer mode file 27 and depending on whether the data is assigned the delete flag or the test data flag Each "X" shown on the left of the tables of FIGS. 12B and 13B indicates that information in the relevant row is part of the power system information to be deleted.

With this arrangement, the edit-queuing data to be deleted are automatically deleted also in the original edit-queuing data file 7 of the edit-queuing data file-data attribute view 28 which contains virtual data, and the edit-queuing data not to be deleted are transferred to the data edit unit 8.

A procedure performed by the data deletion check unit 16 is now described with reference to the flowchart of FIG. 14.

First, the data deletion check unit 16 examines all edit-queuing data in the edit-queuing data file-data attribute view 28 in step U1. This check process is specifically explained in relation to steps U2 to U5 below.

The data deletion check unit 16 then judges whether or not checking of all the edit-queuing data in the edit-queuing data file-data attribute view 28 has been completed in step U2. If the checking has not been completed (No in step U2), the data deletion check unit 16 judges whether the value of the delete flag assigned to the edit-queuing data of the next substation number is "1" or not in the on-line mode or the value of the test data flag is "0" or not in the test mode in step U3. If the operating mode is the on-line mode and the delete flag is not "1", or the operating mode is the test mode and the test data flag is not "0" (No in step U3), the data deletion check,unit 16 transfers the edit-queuing data of the relevant substation in the edit-queuing data file 7 to the data edit unit 8 for storage in the power, equipment database 9 without deleting the data in step U4. If the operating mode the on-line mode and the delete flag is "1", or the operating mode is the test mode and the test data flag is "0" (Yes in step U3), the data deletion check unit 16 deletes the edit-queuing data of the relevant substation in the edit-queuing data file-data attribute view 28 and, as a consequence, the corresponding edit-queuing data in the original edit-queuing data file 7 is deleted without being stored in the power equipment database 9 in step U5.

Figure 14:
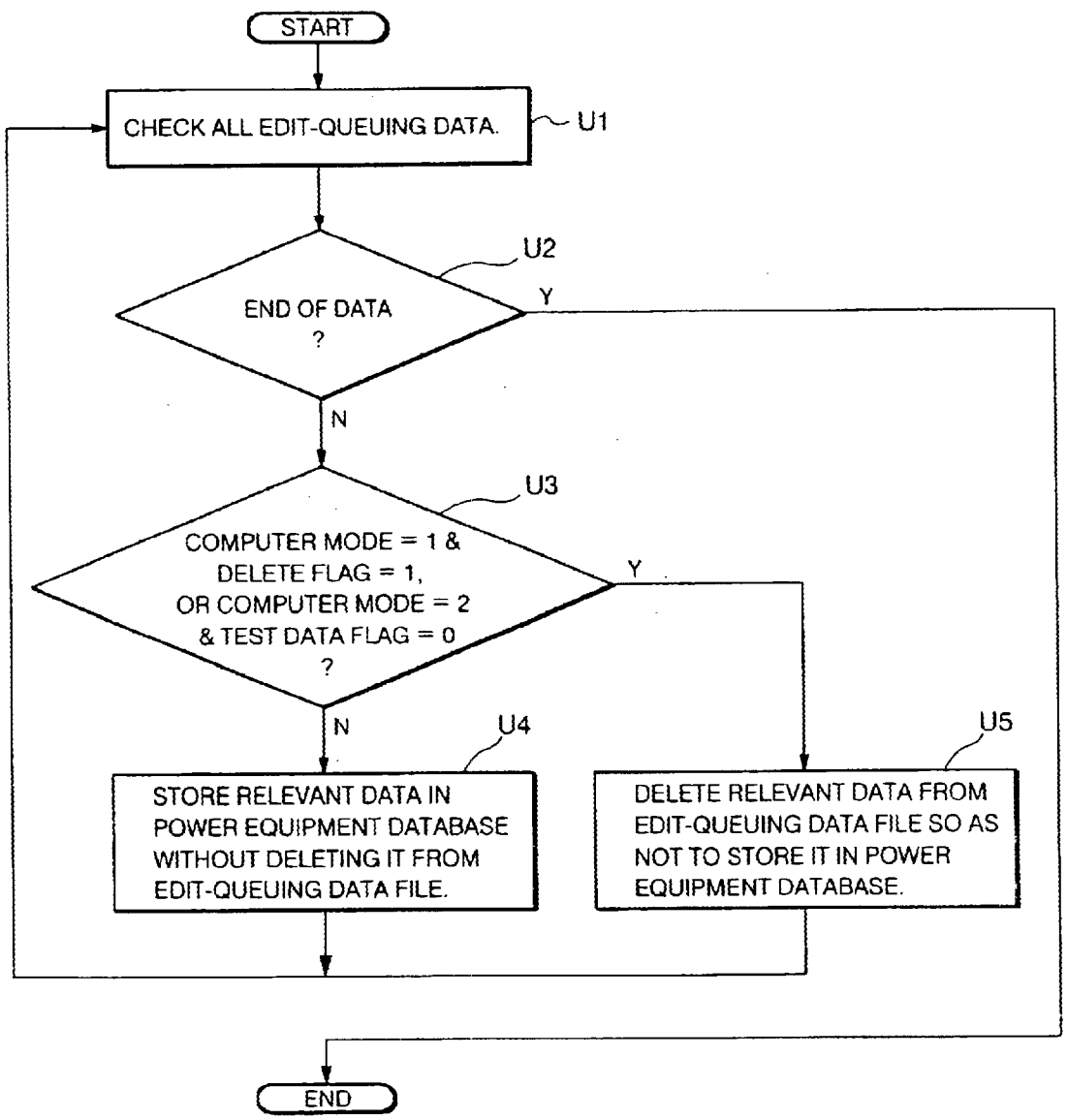
FIG. 14 is a flowchart showing operations performed by a data deletion check unit of the fourth embodiment.

The data deletion check unit 16 repeatedly executes the aforementioned operations of steps U2 to U5 and, when the operations are finished for the edit-queuing data of all the substations, the data deletion check unit 16 judges that the check process has been completed and terminates the procedure of FIG. 14 in step U2.

In this embodiment, not only are inappropriate data deleted in the normal on-line mode as in the aforementioned first to third embodiment, but is the test mode set and are substation numbers to be tested specified when executing a data test. This approach makes it possible to quickly delete other data than test data from the edit-queuing data held in the edit-queuing data file 7, thus enabling the operator to positively recognize only the test data.

Fifth Embodiment

While the delete flags and test data flags are separately held indifferent columns of the tables of FIGS. 12A–12B and 13A–13B in the aforementioned fourth embodiment, they can be expressed by validity flags indicating valid and invalid states of individual edit-queuing data as shown in an edit-queuing data file-data attribute view 28 illustrated in FIG. 15. Although data to be deleted is indicated by a delete flag "1" in the fourth embodiment, the same is indicated by a validity flag "0" in this fifth embodiment. The test data flag of the fourth embodiment is used as a validity flag in this embodiment.

As shown in FIG. 15, the individual edit-queuing data held in the edit-queuing data file-data attribute view 28 are assigned validity flags and, therefore, the data deletion check unit 16 deletes the edit-queuing data which are assigned the validity flag "0" as being invalid regardless of the operating mode specified in the computer mode file 27. Each "X" shown on the left of the tables of. FIG. 15 indicates that information in the relevant row is part of the power system information to be deleted.

With this arrangement, the edit-queuing data to be deleted are automatically deleted also in the original edit-queuing data file 7 of the edit-queuing data file-data attribute view 28 which contains virtual data, and the edit-queuing,data not to be deleted are transferred to the data edit unit 8.

A procedure performed by the data deletion check unit 16 is now described with reference to the flowchart of FIG. 16.

First, the data deletion check unit 16 examines all edit-queuing data in the edit-queuing data file-data attribute view 28 in step V1. This check process is specifically explained in relation to steps V2 to V5 below.

The data deletion check unit 16 then judges whether or not checking of all the edit-queuing data in the edit-queuing data file-data attribute view 28 has been completed in step V2. If the checking has not been completed (No in step V2), the data deletion check unit 16 judges whether the value of the validity flag assigned to the edit-queuing data of the next substation number is "0" or not in step V3. If the validity flag is not "0" (No in step V3), the data deletion check unit 16 transfers the edit-queuing data of the relevant substation in the edit-queuing data file 7 to the data edit unit 8 for storage in the power equipment database 9 without deleting the data in step V4. If the validity flag is "0" (Yes in step V3), the data deletion check unit 16 deletes the edit-queuing data of the relevant substation in the edit-queuing data file-data attribute view 28 and, as a consequence, the corresponding edit-queuing data in the original edit-queuing data file 7 is deleted without being stored in the power equipment database 9 in step V5.

Figure 16:
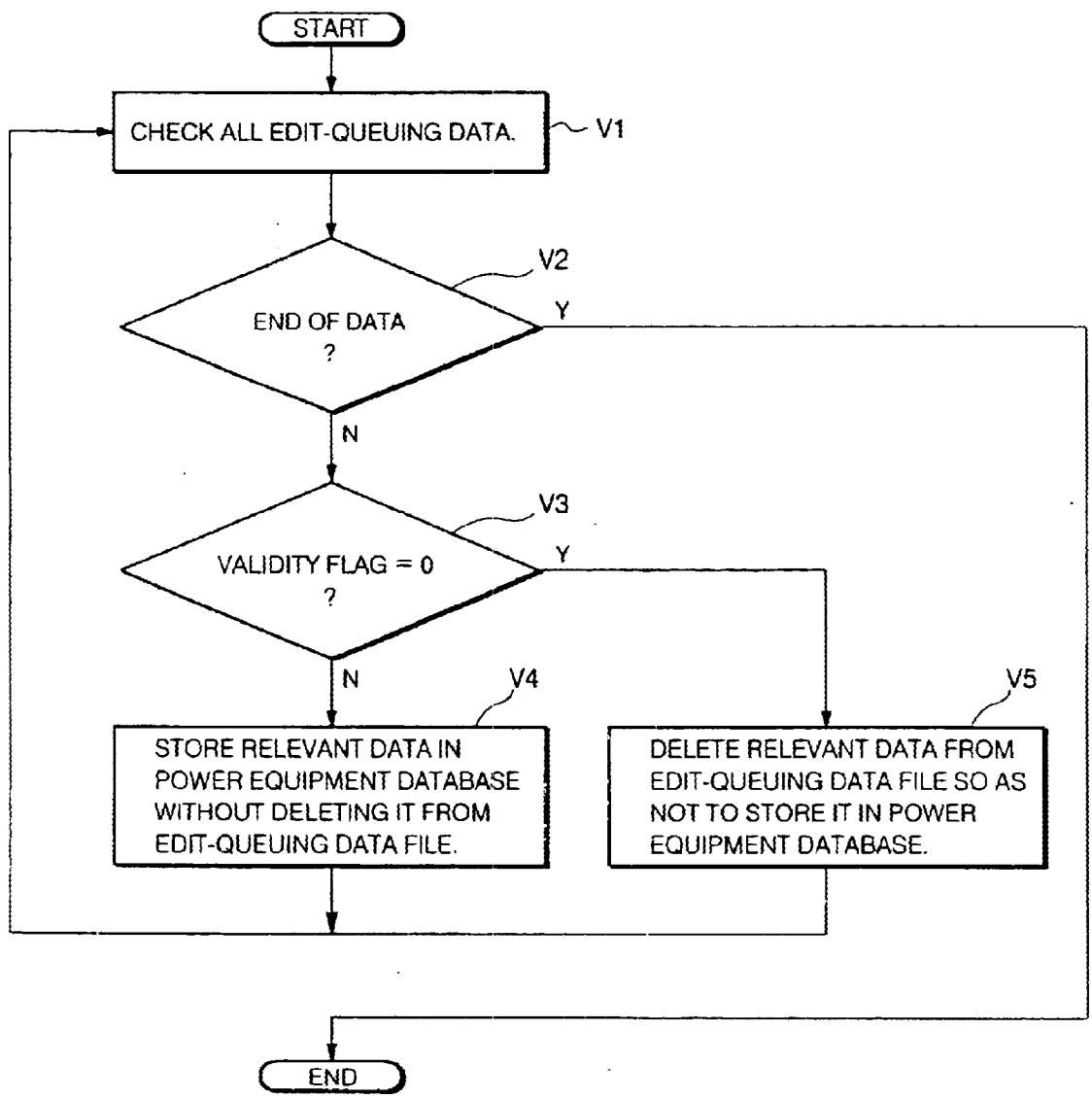
FIG. 16 is a flowchart showing operations performed by a data deletion check unit of the fifth embodiment.
Figure 17:
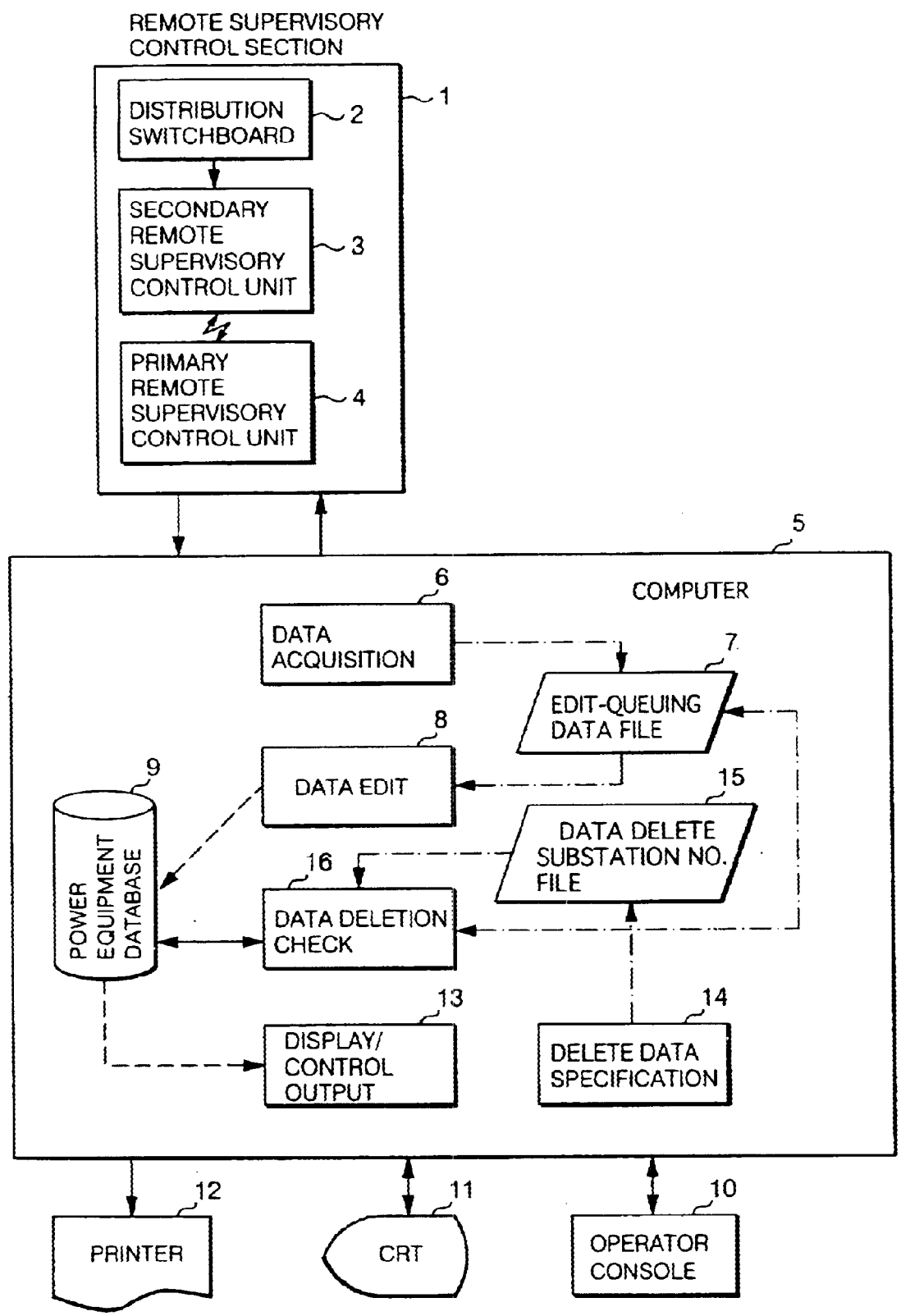
FIG. 17 is a configuration diagram of a conventional supervisory power system control apparatus.
Figure 19:
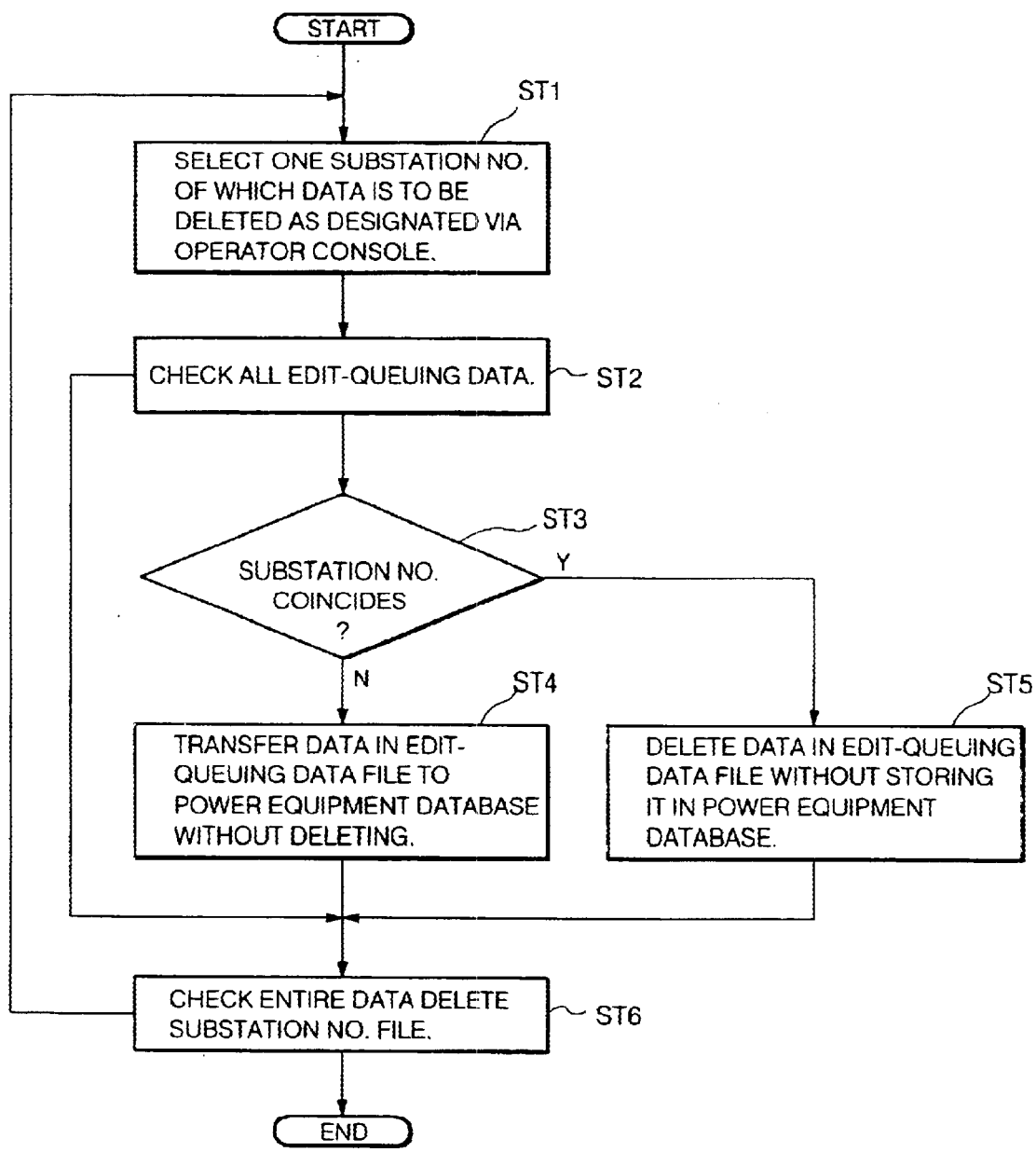
FIG. 19 is a flowchart showing operations performed by a data deletion check unit of the conventional supervisory power system control apparatus.

The data deletion check unit 16 repeatedly executes the aforementioned operations of steps V2 to V5 and, when the operations are finished for the edit-queuing data of all the substations, the data deletion check unit 16 judges that the check process has been completed and terminates the procedure of FIG. 16 in step V2.

Since the delete flag and the test data flag are combined into a single validity flag, it is possible to easily determine whether individual data is the edit-queuing data to be deleted without referring to the operating mode of the computer 5. This would provide a simple operation flow for quickly deleting inappropriate pieces of information, enabling efficient processing of the power system information and an improvement in software maintainability.

What is claimed is:

1. A supervisory power system control apparatus comprising:
    a supervisory control section for monitoring and controlling individual facilities of an electric power system; and
    an information processing section which transmits control instructions for the individual facilities to the supervisory control section, acquires power system information concerning the individual facilities from the supervisory control section, performs a data edit operation on the power system information, stores the power system information edited in a power equipment database, and uses the power system information edited as supervisory control information, wherein said information processing section includes:
        a specifier for judging whether individual items of the power system information are appropriate or inappropriate as the supervisory control information by types of the facilities and specifying a facility type of which power system information is inappropriate according to an external input;
    an allocation file generated by attaching an appropriateness flag to each of the facilities based on information specified by the specifier; and
        a data deletion checker for deleting inappropriate items of the power system information acquired from the supervisory control section referring to the allocation file before performing the data edit operation, wherein only those items of the power system information which are appropriate as the supervisory control information are stored in the power equipment database.

2. The supervisory power system control apparatus according to claim 1, wherein said information processing section employs an operating system having a relational database function and further includes an edit-queuing data file-flag view generated by joining an edit-queuing data file holding the power system information acquired from the supervisory control section and the allocation file in which one of the flags is attached to each of the facilities by use of a join function of the relational database, and wherein the data deletion checker deletes the inappropriate items of the power system information by performing a data delete operation on the edit-queuing data file-flag view.

3. The supervisory power system control apparatus according to claim 1, wherein said information processing section employs an operating system having a relational database function and further includes an edit-queuing normal data file and a delete data file which are generated from an edit-queuing data file holding the power system information acquired from the supervisory control section and the allocation file in which one of the flags is attached to each of the facilities by use of a join function and a filtering function of the relational database, and wherein the data deletion checker deletes the inappropriate items of the power system information by deleting all data in the delete data file.

4. A supervisory power system control apparatus comprising:
    a supervisory control section for monitoring and controlling individual facilities of an electric power system; and
    an information processing section which transmits control instructions for the individual facilities to the supervisory control section, acquires power system information concerning the individual facilities from the supervisory control section, performs a data edit operation on the power system information, stores the power system information edited in a power equipment database, and uses the power system information edited as supervisory control information, wherein said information processing section has two operating modes, a normal mode and a test mode, and includes:
        a first specifier for judging whether individual items of the power system information are appropriate or inappropriate as the supervisory control information by types of the facilities, and for specifying a facility type of which power system information is inappropriate according to an external input;
        a second specifier for specifying test data included in the power system information based on the facility type according to the external input;
        an allocation file generated by attaching an appropriateness flag to each of the facilities based on information specified by the first specifier in the normal mode and by attaching a flag indicating whether data is the test data to each of the facilities based on information specified by the second specifier in the test mode; and
        a data deletion checker for deleting inappropriate items of the power system information acquired from the supervisory control section referring to the allocation file before performing the data edit operation, wherein only those items of the power system information which are appropriate as the supervisory control information are stored in the power equipment database in the normal mode, and only the test data included in the power system information is stored in the power equipment database in the test mode.

5. The supervisory power system control apparatus according to claim 4, wherein the appropriateness flag and the flag indicating whether the data is the test data in the allocation file generated in the normal mode and the test mode, respectively, are together expressed by a validity flag indicating whether the data of a particular facility is valid or invalid, and the data deletion checker deletes those items of the power system information which are assigned the validity flag indicating that the data is invalid, referring to the allocation file regardless of whether the information processing section is in the normal mode or the test mode.

6. A supervisory power system control apparatus comprising:
- a supervisory control section for monitoring and controlling individual facilities of an electric power system; and
- an information processing section which transmits control instructions for the individual facilities to the supervisory control section, acquires power system information concerning the individual facilities from the supervisory control section, performs a data edit operation on the power system information, stores the power system information edited in a power equipment database, and uses the power system information edited as supervisory control information, wherein said information processing section includes:
    - a specifier for judging whether individual items of the power system information are appropriate or inappropriate as the supervisory control information by types of the facilities and specifying a facility type of which power system information is inappropriate according to an external input;
    - an allocation file which is generated by attaching an appropriateness flag to each of the facilities based on information specified by the specifier; and
    - an edit-queuing normal data file and a delete data file which are generated from the allocation file and an edit-queuing data file holding the power system information acquired from the supervisory control section by use of a join function and a filtering function of an operating system having a relational database function, wherein only those items of the power system information which are held in the edit-queuing normal data file are stored in the power equipment database after performing the data edit operation.

* * * * *